Aug. 22, 1950 J. L. MOODY Re. 23,259

CALCULATING MACHINE

Original Filed Aug. 28, 1942 4 Sheets-Sheet 1

INVENTOR
John L. Moody
BY Harper Allen
ATTORNEY

CALCULATING MACHINE

Original Filed Aug. 28, 1942 4 Sheets-Sheet 2

INVENTOR.
John L. Moody
BY Harper Allen
ATTORNEY.

CALCULATING MACHINE

Original Filed Aug. 28, 1942 4 Sheets-Sheet 3

INVENTOR.
John L. Moody
BY
Harper Allen
ATTORNEY.

CALCULATING MACHINE

Original Filed Aug. 28, 1942 4 Sheets-Sheet 4

INVENTOR
John L. Moody
BY Harper Allen
ATTORNEY

Reissued Aug. 22, 1950

Re. 23,259

UNITED STATES PATENT OFFICE 23,259

CALCULATING MACHINE

John L. Moody, Oakland, Calif., assignor to Friden Calculating Machine Co., Inc., a corporation of California Original No. 2,403,111, dated July 2, 1946, Serial No. 456,491, August 28, 1942. Application for reissue and division March 28, 1949, Serial No. 83,981

9 Claims. (Cl. 235—144)

Matter enclosed in heavy brackets [ ] appears in the original patent but forms no part of this reissue specification; matter printed in italics indicates the additions made by reissue

This invention relates to calculating machines and is concerned more particularly with the provision of an improved resetting mechanism for a register which can be selectively split at different ordinal positions in the resetting or clearing operation.

It is an object of the invention to provide an improved split resetting means for a calculating machine.

Another object of the invention is to provide a mechanism of the above character which is simple in construction and can be easily manufactured and installed.

Another object of the invention is to provide a mechanism of the above character which can be selectively disabled when it is desired to reset the entire register.

Other objects and advantages of the invention will be apparent from the following description of a preferred embodiment as illustrated in the accompanying drawings, in which.

The invention as illustrated is embodied in the type of calculating machine disclosed in the patent to Carl M. Friden, 2,229,889, dated January 28, 1941, as modified in the co-pending applications of Carl M. Friden, Serial No. 240,269, filed November 14, 1938, issued August 25, 1942, as Patent Number 2,294,083; Carl M. Friden and Anthony B. Machado, Serial No. 348,966, filed July 31, 1940, *now Patent No. 2,399,917*, and John L. Moody, Serial No. 439,644, filed April 20, 1942, *now Patent No. 2,334,431*.

Figure 1:
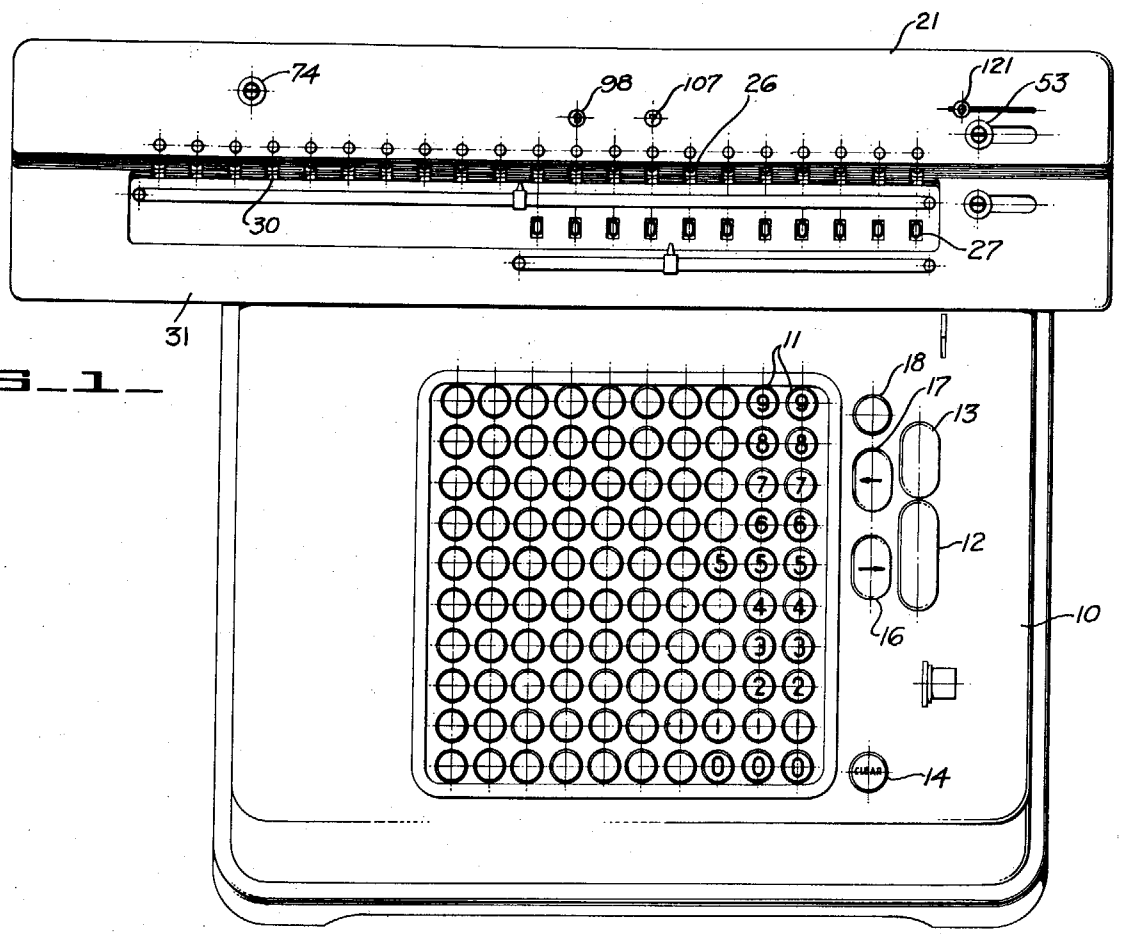
Figure 1 is a plan view of a calculating machine embodying the features of the invention.

Generally, such calculating machines include drive means and actuating means whereby adding, subtracting, multiplying and dividing operations can be carried on with respect to an accumulator mounted in a shiftable carriage. Figure 1 shows a calculating machine having a body 10 on which a register carriage 21 is mounted for endwise shifted movement. The machine is provided with conventional selecting and actuating mechanism controlled during calculated operations by numeral keys 11 and plus and minus keys 12 and 13 in the usual fashion. Clear key 14 is provided for controlling release of depressed numeral keys. Suitable mechanism including shift keys 16 and 17 is provided for shifting the carriage from order to order. Key 18 controls suitable means for causing resetting of the accumulator by power drive means. The above mechanisms are generally conventional and their disclosure is not necessary to an understanding of the instant invention; and for that reason only the shiftable register carriage has been disclosed in this application.

Figure 2:
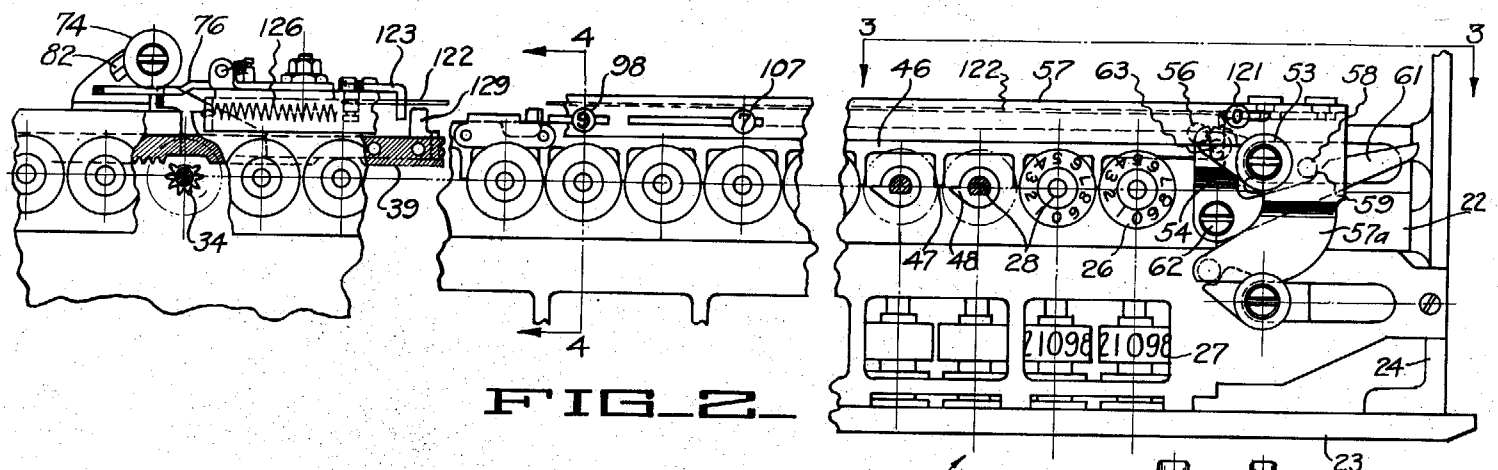
Figure 2 is a plan view of the register carriage with the cover removed, and with certain parts broken away as illustrated in section to show details of the constructions.

Referring to Figure 2, a shiftable register carriage indicated generally at 21 includes the carriage frame 22 and the transverse bar 23 supported in spaced relation on the frame 22 by similar end plates 24, only one of which is shown. The carriage provides a mounting for the numeral wheels or dials 26 of the accumulator and 27 of the revolutions counter.

Figure 4:
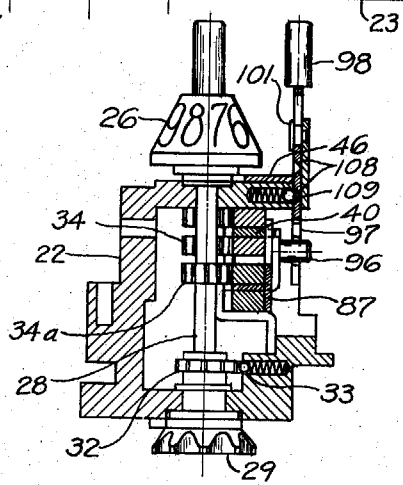
Figure 4 is a sectional view through the carriage taken as indicated by the line 4—4 in Figure 2.

Referring to Figures 2 and 4, each dial 26 is carried by a dial shaft 28 which is suitably journalled between the opposed halves of the carriage frame 22. At its lower end the dial shaft 28 carries a ten tooth gear 29 by means of which values can be introduced into the accumulator as disclosed in said patent. The alignment of the desired figure on the dial with the sight opening 30 (Figure 1) in the cover 31 of the carriage is maintained by a suitable centralizing means including a star-wheel gear 32 (Figure 4) mounted on numeral wheel shaft 28 and cooperating with a spring pressed ball 33. This mechanism is conventional.

To enable resetting of the dials 26 of the accumulator, each shaft 28 carries a resetting gear 34 (Figures 4 and 7) with alternate gears 34 offset axially along their shafts 28. Each gear 34 is mutilated as seen in Figure 2 for example, and the mutilated portion is in the position shown in Figure 2 with the associated dial standing at zero. The eighth and ninth dials 26 have their gears 34a disposed below the gears 34 of the remaining dials for a purpose later described.

Figure 9:
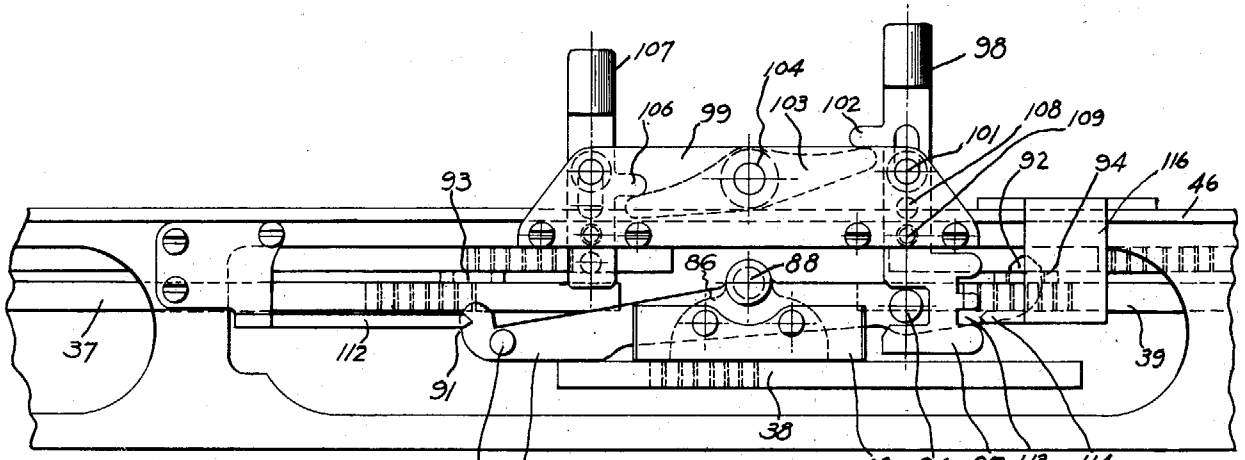
Figure 9 is a rear elevational view of the middle portion of the carriage illustrating the control of the selective splitting means for the resetting means as set to effect splitting between the 7th and 8th dials.

To perform the resetting operation, in connection with the gears 34 of the dials 26, a sectional resetting rack is provided as shown in Figures 4 and 9, having spaced alternately vertically offset gear segments 36 formed on respective sets of parallel bars 37, 38, and 39, of the respective sections. The bars of each rack section are secured in spaced relation by suitable spacers and studs 40. Each gear segment 36 (Figure 8) has a cutaway portion 41 at one side thereof and a raised portion 42 at the other side thereof.

As seen in Figure 9, the resetting rack is split with the left hand portion 37, associated with the seven lowest dials, the middle portion 38 associated with the eighth and ninth dials and the right hand section 39 is associated with the tenth order and all higher order dials 26. Rack sections 37 and 39 are mounted for endwise sliding movement in the same track of the carriage frame and rack section 38 is similarly mounted in lower parallel track.

When a resetting rack section is moved endwise from the position shown in Figure 2 for example, it will serve to rotate any dials which are displaced from zero by engagement with their resetting gears 34 until the mutilated portions of the resetting gears are aligned with the resetting rack when the drive will cease. In order to insure stopping of the numeral wheels or dials at zero without overthrow, a stop slide 46 (Figures 2 and 4) is mounted upon the upper surface of the carriage frame 22 having a series of teeth 47 for engagement with respective stop ears 48 carried by the dial shafts 20. The slide 46 is normally held inactive in the position shown in Figure 2 by a spring 49 (Figure 5) and is temporarily moved to active position during a resetting operation as later described.

Figure 10:
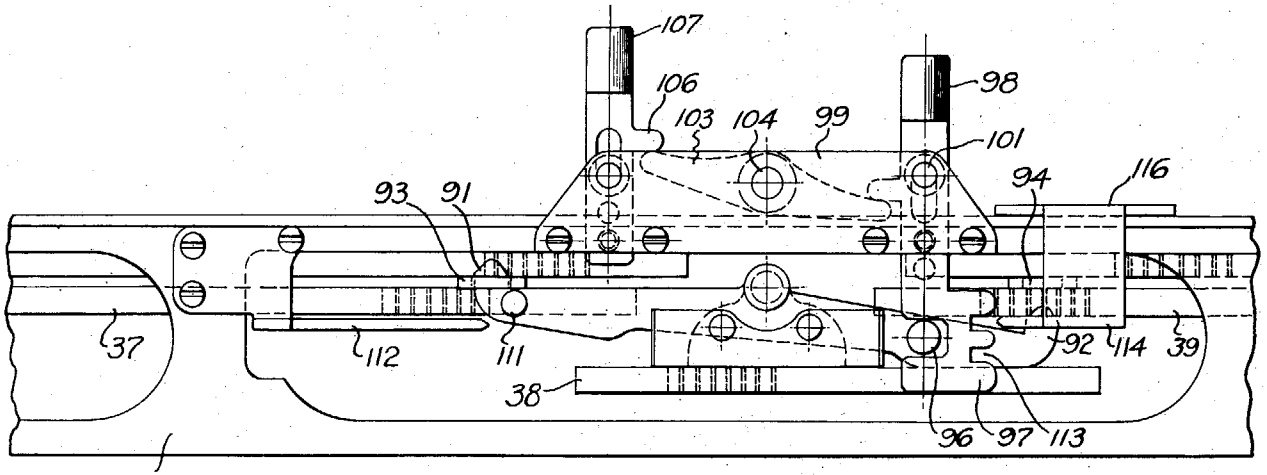
Figure 10 is a view similar to Figure 9 with the splitting means effective between the 9th and 10th dials.

To operate the resetting rack 37 it is provided with a handle 53, the construction of which may be similar to that of the handle 76 disclosed in Figures 9 to 11 in the above-mentioned patent to Friden 2,294,083. The handle 53 can be adjusted as explained in said patent to position an arm 54 for engagement with a pin 56 carried by operating slide 57 which is slidably mounted for endwise movement on the carriage frame. The slide 57 is operable by power operated means of the character disclosed in said Patent Number 2,294,083, or is operated manually when the handle 53 is moved to the right as viewed in Figure 2 because of the engagement of handle 53 with overlapping end portion 57a of the slide 57.

To operate the stop slide 46 during resetting, the slide 57 has a pin 58 (Figure 2) which lies in front of the cam surface 59 of the bellcrank 61 pivoted at 62 on the carriage frame and having a pin and slot connection at 63 with the slide 46.

As previously explained, the resetting rack 37 is associated only with the first to seventh or lower order group of dials, so that operation of handle 53 always operates to reset the first seven dials of the accumulator. The rack 39 associated with the tenth and all higher order dials can be selectively coupled for simultaneous resetting operation with rack 37 of the lower seven dials, and rack 38 for the eighth and ninth dials can be coupled selectively for operation either with rack 37 or rack 39. The coupling of the ten and higher order group to the lower order group will be described first.

Figures 5, 6, 7, 8:
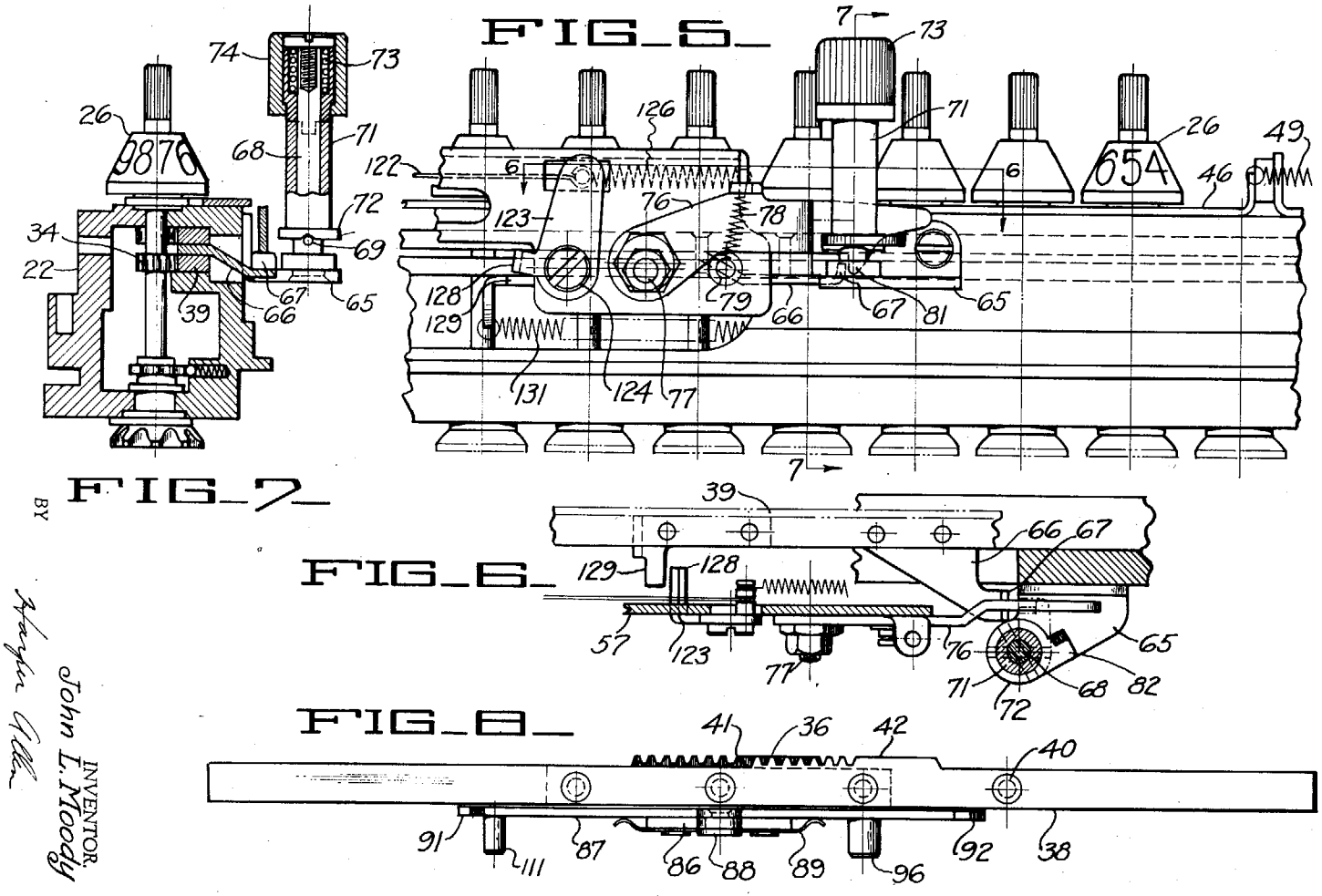
Figure 5 is a rear elevational view of the left end of the carriage.
Figure 6 is a fragmentary sectional view taken as indicated by the line 6—6 in Figure 5.
Figure 7 is a transverse sectional view taken as indicated by the line 7—7 in Figure 5.
Figure 8 is a detail plan view of one of the sectional resetting racks associated with the 8th and 9th dials.

As seen in Figures 5 to 7, the resetting rack 39 associated with the higher order group of dials, is provided with a laterally extending arm 66 which extends through an aperture in the carriage frame and is provided with an upstanding ear 67. A bracket 65 fixed to frame 22 carries a post 68 having a transverse pin 69 therein and receiving a sleeve 71 provided with a disc 72 having transversely aligned seats for the pin 69. Sleeve 71 is spring urged downwardly by spring 73 (Figure 7) held in place by operating handle 74 and a suitable retaining screw.

The ear 67 of arm 66 (Figures 5 to 7) is adapted for engagement by hook 76 adjustably pivoted at 77 on an extension of slide 57 and urged by spring 78 against a stop pin 79. As seen in Figure 5, tooth 81 on hook 76 is engaged with ear 67 so that the resetting rack 39 will be moved upon operation of slide 57. As seen most clearly in Figure 6, disc 72 carries a cam extension 82 which is adapted to be swung from the full line position shown in Figure 6 to the dotted line position where it will engage the camming surface provided by the back face of tooth 81 to lift the hook 76 and tooth 81 thereof above ear 67. In this lifted position of tooth 81, endwise movement of slide 57 is ineffective to move the resetting rack 39 with the rack 37. Thus, if the handle 74 is adjusted to position cam extension 82 as shown in dotted lines in Figure 6, resetting of the higher order dials of the accumulator will not occur in normal operation of resetting slide 57.

As previously stated, means is provided whereby an intermediate group of dials (the eighth and ninth) can be coupled selectively with either the lower order group or the higher order group. Referring to Figures 8 and 9, the middle rack section 38 of the central rack carries an upright bracket 86 on which a walking beam lever 87 is pivoted at 88. Lever 87 is subjected to the friction pressure of a double-ended leaf spring 89. The two ends of lever 87 are provided with respective upwardly projecting teeth 91 and 92 for engagement with respective apertured ears 93 and 94 of racks 37 and 39 respectively, so that by adjustment of lever 87, the center rack section 38 can be connected for simultaneous movement with either of the adjacent resetting rack sections 37 or 39.

To enable adjustment thereof, lever 87 (Figures 4, 9 and 10) carries a pin 96 engaged by the notched lower end of a key stem 97 of key 98. Key 98 is mounted for endwise sliding movement on bracket 99 by engagement with a suitable guideway therein and by stud 101 engaging a lengthwise slot in the key stem. Key 98 has an ear 102 overlying a lever 103, pivoted at 104 on bracket 99. The opposite end of lever 103 is disposed beneath ear 106 of key 107 similarly mounted on the bracket 99. Each of keys 98 and 107 is provided with a pair of latching recesses 108 for engagement by an associated spring-urged ball 109 to maintain the key resiliently in either raised or depressed position.

From the above description it is seen that by suitable adjustment of the keys 98 and 107 the lever 87 can be adjusted to connect central rack 38 with either of racks 37 or 39 so that the resetting means can be split selectively at either the seventh order dial or at the ninth order dial. Figure 9 shows the adjustment for splitting of the resetting means between the seventh and eighth dials, while Figure 10 shows the adjustment for splitting between the ninth and tenth dials.

To guard against accidental loss of the selective splitting adjustment during the resetting operation, the walking beam lever 87 is provided with a pin 111 (Figures 9 and 10) which is adapted to pass either above or below a locking tooth 112 mounted on the carriage frame 22. Also the key stem 97 is provided with spaced vertical notches 113 which are adapted for engagement by locking tooth 114 carried by a bracket 116 on the stop slide 46.

Figure 3:
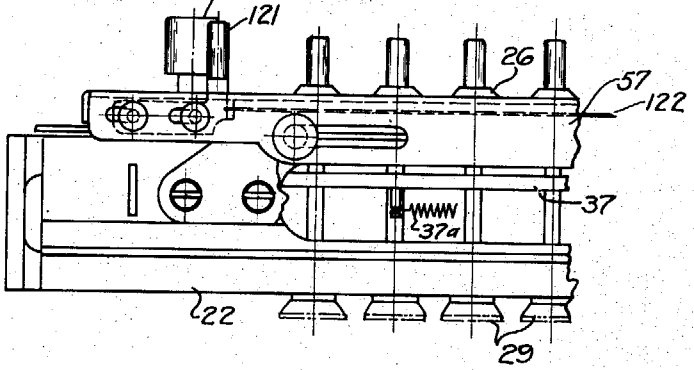
Figure 3 is a rear elevational view of the right hand end of the carriage taken as indicated by the line 3—3 in Figure 2.

To disable the splitting mechanism without changing the adjustment of the control handle 74 to cause such splitting, the operating slide or rack 57 of the power resetting mechanism is provided with a small key 121 (Figures 2 and 3) adjacent the manual handle 53 for the resetting mechanism. The key 121 is mounted for sliding movement endwise of the rack 57 by means of a suitable pin and slot connection therewith, and is connected by a link 122 (Figures 2, 3 and 5) with a bellcrank 123 pivoted at 124 on the slide 57. Spring 126 urges pawl 123, link 122 and key 121 to the positions shown in Figures 2, 3 and 5. The pawl 123 (Figures 5 and 6) is provided with offset ear 128, which upon operation of the key 121, is moved into the path of ear 129 of the resetting rack 39 which also provides a fastening for return spring 131 thereof. If key 121 is operated with handle 53, pawl 123 is moved to engage ears 128 and 129 so that rack 39 will be moved with slide 57 irrespective of the setting of the control handle 74. In this way, *and by means of the supplemental resetting means including the control member or key 121*, all of the dials can be restored to zero, irrespective of setting of the machine for normal split resetting operations.

From the above description it will be seen that the resetting means can be adjusted to obtain several desired results in the way of split operation. For example, if handle 53 is adjusted as shown in Figure 2 so that arm 54 is active and handle 74 is adjusted to make the cam finger 82 inactive, operation of slide 57 will serve to reset all of the dials irrespective of depression of keys 98 or 107. By appropriate adjustment of handles 53 and 74, the operation of slide 57 can cause resetting of the lower order group of dials alone or of the higher order group alone while the number of dials in both the higher and lower order groups can be controlled by appropriate adjustment of keys 98 and 107. With key 74 set to disable the resetting means for the higher order group of dials, their resetting can be effected by operation of the small key 121 with the handle 53.

*The claims of original Patent 2,403,111, some amended, are distributed in this reissue application and divisional reissue application Serial No. 155,766, filed April 13, 1950, now Reissue No. 23,260. Claim 1 and claims 3 and 4 (with amendments) of original Patent 2,403,111 are claims 1, 2, and 3, respectively, herein, and claims 4 to 9, inclusive, herein are new claims.*

I claim:

*1.* In a calculating machine, a register comprising a series of dials, sectionalized resetting means for said dials including respective end sections for two end groups of said dials, operating means for said resetting means, settable means for selectively causing operation of one of said end sections by said operating means, and means including a manually operable control member for causing operation of said one end section by said operating means irrespective of the setting of said settable means.

*2.* In a calculating machine having a register for accumulating values therein, said register comprising a series of numeral wheels arranged in a row and adapted in one type of machine operation to display a single total up to the full capacity of said register and in another type of machine operation to display two totals separately accumulated in two parts of said series of numeral wheels: zero resetting means including two movable means, movement of one of said movable means causing all the numeral wheels in one part of said series of numeral wheels to be reset to zero, movement of the other of said movable means causing all the numeral wheels in another part of said series of numeral wheels to be reset to zero, an actuating means for said movable means, a selectively operable means for controlling a connection between one of said movable means and said actuating means, whereby in the type of operation where it is desired to accumulate single totals to the full capacity of the register said controlling means may be selectively operated to establish said connection so that operation of said actuating means will result in resetting the entire series of numeral wheels to zero, and in the other type of operation where two totals are separately accumulated in different parts of said register said controlling means may be selectively operated to disable said connection so that operation of said actuating means will result in clearing one total from the register by resetting part of said series of numeral wheels to zero and will result in retaining the other total in said register by preventing the other part of said series of numeral wheels from being reset to zero by said actuating means, *and supplemental resetting means for causing operation of both said movable means irrespective of the setting of said selectively operable means, said supplemental resetting means including a manually operable member for causing operation of one of said movable means.*

*3.* In a calculating machine having a register for accumulating values therein, said register comprising a series of numeral wheels arranged in a row and adapted in one type of machine operation to display a single total up to the full capacity of said register and in another type of machine operation to display two totals separately accumulated in two parts of said series of numeral wheels: zero resetting means including two movable means, movement of one of said movable means causing all the numeral wheels in one part of said series of numeral wheels to be reset to zero, movement of the other of said movable means causing all the numeral wheels in another part of said series of numeral wheels to be reset to zero, an actuating means, a selectively operable means for controlling a connection between one of said movable means and said actuating means, another selectively operable means for controlling a connection between the other of said movable means and said actuating means, whereby in the type of machine operation where it is desired to accumulate single totals up to the full capacity of the register both said controlling means may be operated to establish connections between both said movable means and said actuating means so that operation of said actuating means will result in resetting the entire series of numeral wheels to zero, and in the other type of machine operation where two totals are separately accumulated in different parts of said register each of said controlling means may be selectively operated to establish or disable the connection between its associated movable means and said actuating means so that operation of said actuating means will cause clearing of one total from the register and retention of the other or vice versa depending upon the selective operation of said controlling means, *and supplemental resetting means including a manually operable member for causing operation of both said movable means irrespective of the setting of said selectively operable means.*

*4. In a calculating machine, a register comprising a series of dials arranged ordinally to register respectively the digits of a plural order value, a gear member associated with each of such dials, a resetting member engaging the gear members associated with one end group of said dials, a second resetting member engaging the gear members associated with the other end group of said dials, operating means for said resetting members, means including a settable device for selectively causing operation of one of said resetting members by said operating means, and means including a manually operable control member for causing operation of said one of said resetting members by said operating means irrespective of the setting of said settable device.*

*5. In a calculating machine having a register for accumulating values therein, said register comprising a series of numeral wheels arranged in a row and adapted in one type of machine operation to display a single total up to the full capacity of said register and in another type of machine operation to display two totals separately accumulated in two parts of said series of numeral wheels: zero resetting means including two movable means, movement of one of said movable means causing all the numeral wheels to be reset to zero, movement of the other of said movable means causing all the numeral wheels in another part of said series of numeral wheels to be reset to zero, an actuating means for said movable means, means including a settable device for selectively causing operation of one of said movable means by said actuating means, and supplemental resetting means for causing operation of both said movable means irrespective of the setting of said settable device, said supplemental resetting means including a manually operable member for causing operation of said one of said movable means.*

*6. In a calculating machine having a register for accumulating values therein, said register comprising a series of numeral wheels arranged in a row and adapted in one type of machine operation to display a single total up to the full capacity of said register and in another type of machine operation to display two totals separately accumulated in two parts of said series of numeral wheels; zero resetting means including two movable means, movement of one of said movable means causing all the numeral wheels in one part of said series of numeral wheels to be reset to zero and movement of the other of said movable means causing all the numeral wheels in another part of said series of numeral wheels to be reset to zero, a power driven actuating means for said movable means, a manually operable member for controlling operation of said actuating means, means including a settable device for selectively causing operation of one of said movable means by said actuating means, and supplemental resetting means for causing operation of both said movable means irrespective of the setting of said settable device, said supplemental resetting means including a manually operable member for causing operation of said one of said movable means.*

*7. In a calculating machine having a register for accumulating values therein, said register comprising a series of numeral wheels arranged in a row and adapted in one type of machine operation to display a single total up to the full capacity of said register and in another type of machine operation to display two totals separately accumulated in two parts of said series of numeral wheels: zero resetting means including two movable means, movement of one of said movable means causing all the numeral wheels in one part of said series of numeral wheels to be reset to zero, movement of the other of said movable means causing all the numeral wheels in another part of said series of numeral wheels to be reset to zero, an actuating means for said movable means, a selectively operable means for controlling a connection between one of said movable means and said actuating means, whereby in the type of operation where it is desired to accumulate single totals to the full capacity of the register said controlling means may be selectively operated to establish said connection so that operation of said actuating means will result in resetting the entire series of numeral wheels to zero, and in the other type of operation where two totals are separately accumulated in different parts of said register said controlling means may be selectively operated to disable said connection so that operation of said actuating means will result in clearing one total from the register by resetting part of said series of numeral wheels to zero and will result in retaining the other total in said register by preventing the other part of said series of numeral wheels from being reset to zero by said actuating means, and supplemental resetting means including a manually operable member for causing operation of both said movable means irrespective of the setting of said selectively operable means.*

*8. In a calculating machine having a register for accumulating values therein, said register comprising a series of numeral wheels arranged in a row and adapted in one type of machine operation to display a single total up to the full capacity of said register and in another type of machine operation to display two totals separately accumulated in two parts of said series of numeral wheels: zero resetting means including two movable means, movement of one of said movable means causing all the numeral wheels in one part of said series of numeral wheels to be reset to zero, movement of the other of said movable means causing all the numeral wheels in another part of said series of numeral wheels to be reset to zero, an actuating means for said movable means, means including a settable device for selectively causing operation of one of said movable means by said actuating means, and supplemental resetting means including a manually operable member for causing operation of both said movable means irrespective of the setting of said settable device.*

*9. In a calculating machine having a register for accumulating values therein, said register comprising a series of numeral wheels arranged in a row and adapted in one type of machine operation to display a single total up to the full capacity of said register and in another type of machine operation to display two totals separately accumulated in two parts of said series of numeral wheels; zero resetting means including two movable means, movement of one of said movable means causing all the numeral wheels in one part of said series of numeral wheels to be reset to zero and movement of the other of said*

*movable means causing all the numeral wheels in another part of said series of numeral wheels to be reset to zero, a power driven actuating means for said movable means, a manually operable member for controlling operation of said actuating means, means including a settable device for selectively causing operation of one of said movable means by said actuating means, and supplemental resetting means including a manually operable member for causing operation of both said movable means irrespective of the setting of said settable device.*

JOHN L. MOODY.

REFERENCES CITED

The following references are of record in the file of this or the original patent:

UNITED STATES PATENTS

| Number | Name | Date |
|---|---|---|
| 1,061,137 | Stemmler et al. | May 6, 1913 |
| 1,860,490 | Britten | May 31, 1932 |
| 1,974,529 | Brown | Sept. 25, 1934 |
| 2,294,083 | Friden | Aug. 25, 1942 |